Sept. 20, 1949.  D. GONDA  2,482,265
GLAZED SYNTHETIC RESIN STRUCTURE
Original Filed Feb. 23, 1945  2 Sheets-Sheet 1
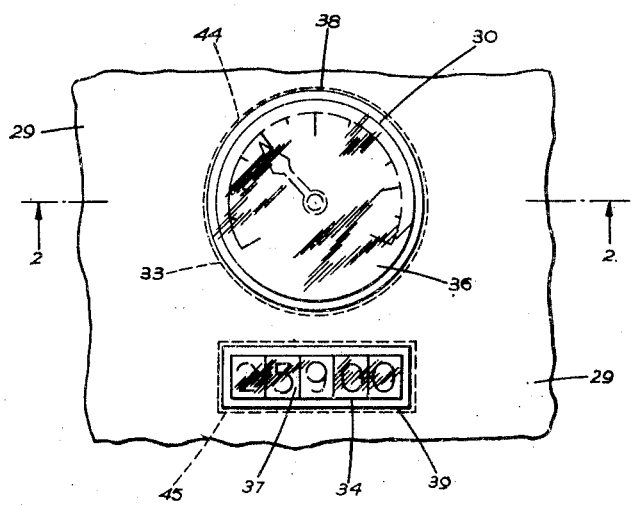
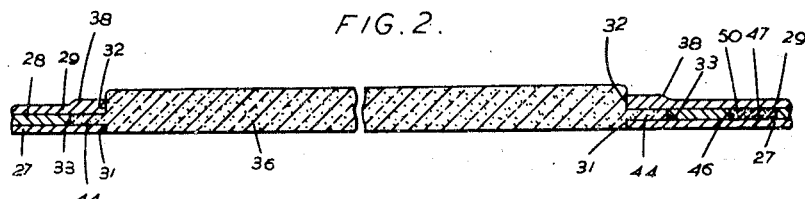
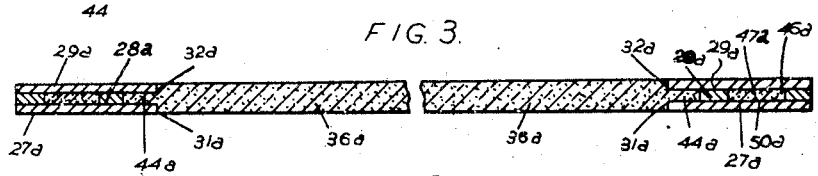
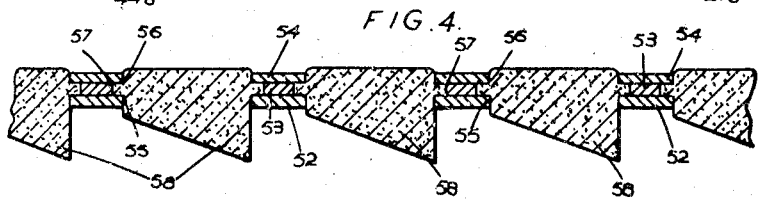
*Inventor*
DESIRÉ GONDA
By
*Toulmin & Toulmin*
*Attorney*

Sept. 20, 1949.  D. GONDA  2,482,265
GLAZED SYNTHETIC RESIN STRUCTURE
Original Filed Feb. 23, 1945  2 Sheets-Sheet 2

INVENTOR
DESIRE GONDA
Toulmin & Toulmin
ATTORNEYS

Patented Sept. 20, 1949

2,482,265

UNITED STATES PATENT OFFICE 2,482,265

GLAZED SYNTHETIC RESIN STRUCTURE

Desiré Gonda, Sittingbourne, England

Application February 23, 1945, Serial No. 579,428, which is a division of application Serial No. 371,837. Divided and this application August 2, 1946, Serial No. 687,810. In Great Britain December 27, 1939

1 Claim. (Cl. 154—43)

This application is a division of my application Serial No. 579,428, filed February 23, 1945, which itself was a division of my application Serial No. 371,837, filed December 26, 1940, now abandoned. The invention herein described relates to improvements in glazed synthetic resin structures and method of producing the same. By "glazed" structures I mean bodies or frames having an opening or openings therethrough in which is mounted a material which transmits light, such openings thus serving as windows, or the like. The light-transmitting material utilized herein is a synthetic thermo-plastic resin, such as an acrylic resin, which when moulded and set is of a transparent or translucent character, and the body or frame in which the same is mounted comprises a material comprising or containing a synthetic resin, this body being preferably formed of fibrous sheets or laminations treated with and containing a thermo-setting synthetic resin. Articles formed in accordance with the invention are, for example, instrument panels or covers for use in automobiles or aircraft; wind shields for vehicles and aircraft; windows, fanlights, pavement lights, and the like. The finished structure, as the result of moulding under heat and pressure, has all of its parts strongly bonded together, the resins thereof being set and hardened, with the "glazing" or light-transmitting material firmly bonded to and within its seating in an air, dust, and moistureproof manner.

The opening or openings in which the light-transmitting material is mounted is or are preferably provided with a keying recess or recesses extending therefrom into the body of the structure, whereby an interlocking of the light-transmitting material in the said opening or openings, with the body of the structure, is effected. Preferably, the said body or frame is built up of three or more of the said resin-treated fibrous sheets, which are provided with perforations which are aligned when the sheets are superposed, to form the opening or openings for the "glazing," these perforations being filled with the material, such as polymerized methyl methacrylate resin which will produce a transparent or translucent body when moulded. The aligned openings of the superposed sheets are so related to each other in size or shape as to provide the desired interlock. If three sheets only are used, such limitation not being essential, preferably, the intermediate one of these three sheets is provided with an opening of greater diameter or area in a plane parallel to the surface of the sheet that the aligned openings of the two adjacent sheets, so that when the methacrylate resin or the like in the openings flows under the heat and pressure of moulding it will flow into the peripheral portion of this larger opening, between the adjacent fibrous sheets. When the resins set, this laterally-extending portion of the window forming material will form a keying part. All of the parts will then be firmly bonded together, a tight joint being formed between the window-forming resin material and its surrounding frame, by the bonding of the side surfaces of the columns of window-forming material to the resin of the scrrounding fibrous sheets, as well as by the bonding of the said keying projections of the window-forming material with the resin of the fibrous sheets between which they are interposed.

By such means the difficulty, sometimes previously encountered, of providing a dust, air and moisture-proof seal between a window-forming part and its seating is overcome in a simple manner, and one which lends itself to relatively rapid and inexpensive production. Further, another important result is obtained by the described construction. When the described laterally-extending projections of the window-forming resin are not employed, there is a danger of the pigments of the fibrous sheets flowing into the window-forming resin and causing a discoloration thereof. When, however, provision is made for some of the window-forming resin flowing in the peripheral recess between the two outermost of three superposed sheets it is found that this danger is avoided and a perfectly clear window is obtained.

In the preferred construction, also additional perforations are provided through some but not all of the fibrous laminations of the structure, which are filled with column-like bodies of a synthetic resin material which, upon setting and hardening, are bonded at their side surfaces to the resin of the sheets through which they pass, and at their ends to imperforate portions of other sheets against which they abut. By this means a laminated structure of improved mechanical and other properties is provided and in which the tendency of such structures to delaminate, when subjected to vibration, etc. is overcome.

The objects of the invention comprise the provision of improved structures of the character referred to, and an improved method of producing the same. In the method of manufacture, such temperatures and pressures are used in the moulding of the assembly as to cause the thermo-setting resin of the fibrous sheets to begin to flow and the acrylic resin or like transparent body resin thereafter to commence to flow, until the thermo-setting resin hardens. Thereafter the temperature of the mould is lowered, pressure being maintained, to cause the window-forming resin (which is thermo-plastic) to set and harden.

In order that the invention may be understood more clearly, attention is directed to the accompanying drawings, illustrating certain embodiments of the improved construction, in which:—

Figure 1 is a front elevation of a part of an instrument panel made in accordance with the invention;

Figure 2 is a section on line 2—2 of Figure 1;

Figure 3 is a section similar to that shown in Figure 2 taken through a fanlight embodying the invention;

Figure 4 is a vertical section through a portion of a cellar or pavement light also made in accordance with the invention, and Fig. 5 is an enlarged partial sectional view similar to Fig. 2, showing more clearly the reinforcing column-like bodies referred to.

Figure 5:
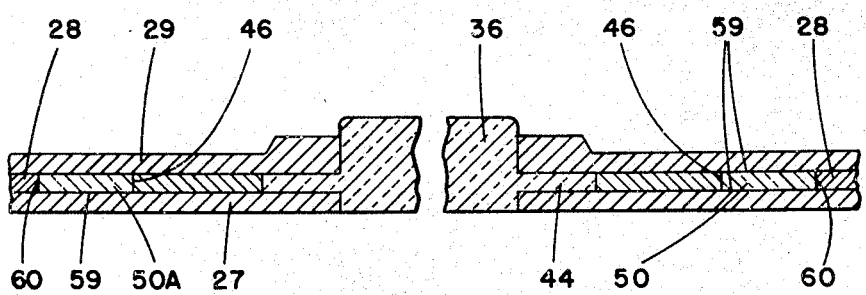

Referring first to Figures 1 and 2, these show a portion of a preferred construction of an instrument panel for use in an automobile or in an aeroplane, for example. In the form illustrated, this panel is formed of three sheets, 27, 28, and 29, of fibrous material, superposed one upon the other, these sheets being treated with and containing a thermo-setting synthetic resin. Preferably they are impregnated with a solution of such a resin, such as phenol-formaldehyde resin, and dried before the assembly of the sheets. It should be understood that each of the sheets 27, 28 and 29, may, and preferably does, itself consist of a plurality of fibrous sheets, such as manila paper of a suitable thickness that are impregnated and assembled together.

Each of these sheets, as shown, has a pair of relatively large openings or perforations therethrough, one being a large circular aperture and the other a rectangular aperture, the circular apertures registering with each other when the sheets are assembled, and the same with the rectangular openings. The registering apertures in the sheets 27 and 29 are of the same size, but the apertures in the intermediate sheet 28, although aligned with the apertures in the other sheets, are larger than these apertures. Thus, in connection with the circular opening, generally indicated in Figure 1 by the reference 30, the outer sheets 27 and 29 are respectively provided with coaxial holes 31 and 32 each of precisely the same size while the sheet 28 is provided with a hole 33 coaxial with the holes 31 and 32 but considerably (say one half of an inch) larger in diameter. Similarly, the rectangular apertures in the sheets 27 and 29 defining the rectangular aperture 34 are smaller in area than the corresponding aperture 45 in the sheet 28.

In producing the instrument panel the superposed impregnated and dried sheets 27, 28 and 29 are laid in the lower part of a mould having a flat bottom and the cavity formed by the apertures 31, 33 and 32 and the cavity 34 formed by similar but rectangular apertures provided in the sheets 27, 28 and 29, as stated above, are filled with a thermo-plastic synthetic resin moulding powder (for example, methyl methacrylate resinoid) which when set will result in a transparent body, and the top half of the mould is then placed in position on the lower half and the whole inserted in a press and pressure and heat are applied to cause the flow and moulding of the material. This heat and pressure also effects the setting of the thermo-setting synthetic resin with which the sheets 27, 28 and 29 are impregnated but while maintaining the pressure the temperature of the mould must be reduced to effect the setting of the methyl methacrylate resinoid. The material placed in the cavities 30 and 34 becomes moulded to the required form and hardens to form transparent windows 36 and 37.

The upper part of the mould is preferably cavitied so that the marginal portions 38 and 39 of the fibrous sheet 29 surrounding each of the apertures 30 and 34 stand, in the finished product, above the rest of the upper surface of the sheet 29. The upper mould is also preferably still further cavitied so as to mould the windows 36 and 37 in such a way that they themselves are somewhat thicker within the apertures 30 and 34 than the thickest part of the basic material.

During the moulding and hardening treatment the synthetic resin material forming the windows 36 and 37 flows between the sheets 27 and 29 and thus forms laterally extending marginal keying parts 44 and 45 which are trapped between the sheets 27 and 29 and are, as it were, welded to or amalgamated with these sheets 27 and 29 and to the sheet 28 by reason of the interflowing of the synthetic resin of the window-forming parts and the sheets 27, 28 and 29.

It is found desirable to permit the synthetic resin material forming the window or windows to flow between the sheets 27 and 29 to the extent indicated, not only for the purpose of interlocking the parts, but also to avoid the danger of the pigment of the sheets 27 and 29 flowing into the window-forming resin and causing discoloration thereof. I have found that such discoloration is liable to occur is such a provision as I have described is not made, but that, where the window-forming resin is allowed to flow outwardly in the peripheral spaces provided between sheets 27 and 29 this flowing of the pigments into the window-forming material is prevented and a perfectly clear window is obtained.

In manufacturing a material of the kind just explained the assemblage of materials in the mould should be placed with the mould into a preheated hydraulic press and a supply of running cooling water should be available. After placing the mould in the press it should be heated up to 300 to 320° F. and a pressure of 500–2240 lbs./sq. inch should be applied depending upon the materials being employed, the particular form, and the dimensions of the article being made. When the necessary temperature has been reached while the materials are under pressure the synthetic resin of the fibrous sheets commences to flow and on the gradual application of further increments of pressure between 100 and 200 lbs. per square inch the acrylic resin or other transparent body forming resin commences to flow until the fibrous sheets are hardened. The mould should then be cooled down rapidly by the cooling water so as to cause the window forming resin to set and harden. After ejection of the article from the mould no further operations thereon are necessary and the windows make a perfectly dustproof, air-tight, and moisture-tight joint with the surrounding material.

In an instrument panel of the character referred to the various sheets of fibrous material may be reinforced by column-like bodies of thermo-setting synthetic resin material. At the right-hand side of Figure 2 one such form of reinforcement has been illustrated. It will be seen from this part of Figure 2 that the sheet 28 is provided with a perforation 46 which, before assembly of the sheets 27, 28 and 29, is filled with thermo-setting synthetic resin material 47 with, or without, a fibrous or other suitable filler so that when the assembly is subjected to pressure and heat a reinforcing column, generally indicated by the reference 50, is produced. Such reinforcing columns become bonded at their ends to the imperforate portions of sheets 27 and 29 against which they abut and on their side surfaces to the material of the sheet 28 bounding the openings therethrough through which said columns pass, because of the flowing and subsequent hardening of the resin in the columns and in the sheets. Such reinforcing columns, as described in my application Serial No. 579,428 of which this application is a division, impart improved mechanical and other useful properties to a laminated structure such as is herein shown, and reduce to a considerable degree the tendency of such laminated structures to delaminate in use, as, for example, when subjected to vibration. This construction is shown more clearly in Fig. 5, in which two of the reinforcing columns, 50, 50A, are shown, extending through perforations 46, 46, in sheet 28. These short columns become bonded at their ends, as indicated at 59, to the imperforate portions of sheets 27 and 29 against which they abut, and at their side surfaces, as is indicated at 60, to the material of the sheet 28 bounding the openings 46.

Figure 3 illustrates a modified arrangement of a panel having a transparent window-light or fan-light therein wherein the window-light is of the same thickness as the main body of the panel. The device illustrated in Figure 3 is constructed in the same manner as that previously disclosed with regard to Figures 1 and 2 and the same reference numerals are applied to the device shown in Figure 3 as are applied to the device illustrated in Figure 2 but with the suffix "a" attached thereto. The frame in which the window-light is mounted is preferably provided with a plurality of reinforcing columns 50a, similar to the columns 50, described in connection with Figure 2.

Figure 4 shows a cellar or pavement light constructed in accordance with this invention wherein the body of the light consists of three fibrous sheets 52, 53 and 54. These sheets are all perforated, the sheets 52 and 54 being provided with equally spaced perforations 55 and 56 corresponding in size and position while the sheet 53 is provided with the perforations 57 in register with the perforations 55 and 56 but somewhat larger than the perforations 55 and 56. The synthetic resin forming the transporent light-transmitting elements 58 is moulded at the time of bonding of the sheets 52, 53 and 54 under pressure and heat in the manner heretofore described. In the example shown the elements 58 have their lower surfaces moulded to prismatic form, so that the elements act as light refractors.

The sheets from which the body or frame of the various glazed structures described are constructed may be made of any of the usual fibrous materials employed in the manufacture of laminated plastics, e. g., sheets of paper, cardboard, millboard, strawboard, cellulose pulp sheets, or fabric (e. g. canvas, linen, silk) or asbestos. The resin used may be, for example a phenol-formaldehyde resin, a cresol-formaldehyde resin, or a urea-formaldehyde resin. The various sheets constituting the said body or frame are superposed and bonded together by the application of heat and pressure in a manner similar to that normally employed in the production of laminated thermo-setting products. Where transverse reinforcing columns are provided in the body or frame these columns may be formed solely of thermo-setting synthetic resin or may include fillers as well. The fillers may be fibrous or of other forms or a mixture. Thus in some instances the filler may be mica and in other cases silica. The windows or glazing of the structures according to this invention may be formed of any suitable known mouldable plastic (of which there are several) which is of a glass-like character when set. Polymerised methyl methacrylate is a substance which has proved satisfactory for this purpose. It should be noted that the moulding and setting of this material is effected in the same operation with the bonding together of the various sheets constituting the frame or body and with the uniting of the glazing with the frame or body. In the process, it will be noted, both the thermo-setting resin of the fibrous sheets and the thermo-plastic resin of the windows or glazing are sufficiently plastic to flow under pressure, at the same time, before the setting of the former, this ensuring the thorough bonding together of these resins at all points at which they come in contact.

It will be obvious that structures manufactured according to this invention may be applied to the manufacture of wind-screens and other articles so as to replace the usual metal or wooden frames containing a glazing glass and that articles produced in accordance with this invention have the advantage of being, at the junction of the opaque and transparent portions dust, air and moisture-proof without special attention or provision being given or made to deal with this aspect of the matter. Moreover, it will be clear that articles made in accordance with this invention will be durable, have a well finished appearance, and yet be relatively inexpensive to produce, and can be manufactured readily in considerable quantities.

What I claim is:

As a new article of manufacture, a glazed synthetic resin structure, comprising a plurality of at least three perforated fibrous sheets impregnated with a thermo-setting formaldehyde-condensation-product resin and rigidly bonded together by said resin in superposed relationship with the perforations thereof in alignment, a perforation of an inner one of said sheets being larger in area than the aligned perforations of sheets on opposite sides thereof, and a light-transmitting methyl methacrylate resin in said aligned perforations and extending within the peripheral portion of said larger perforation located between said other sheets, the resin of said sheets and within said perforations being set and hardened, and said light-transmitting resin being bonded to the resin of said sheets by the setting of both of said resins, the resin within said perforations constituting a window-like structure and the laminated structure surrounding the same constituting a support therefor.

DESIRÉ GONDA.

REFERENCES CITED

The following references are of record in the file of this patent:

UNITED STATES PATENTS

| Number | Name | Date |
|---|---|---|
| 1,284,296 | Frederick | Nov. 12, 1918 |
| 1,284,432 | O'Conor | Nov. 12, 1918 |
| 1,617,304 | Groeschel | Feb. 7, 1927 |
| 1,861,663 | Lahey | June 7, 1932 |
| 1,931,524 | Becket | Oct. 24, 1933 |
| 2,193,742 | Rohm et al. | Mar. 12, 1940 |
| 2,201,198 | Monroe et al. | May 21, 1940 |
| 2,322,582 | Marini | June 22, 1943 |
| 2,348,287 | Fiekers | May 9, 1944 |
| 2,402,706 | Sprigg | June 25, 1946 |

FOREIGN PATENTS

| Number | Country | Date |
|---|---|---|
| 145,123 | Great Britain | June 21, 1920 |
| 846,639 | France | June 12, 1939 |

OTHER REFERENCES

Ser. No. 243,598, Barchfield (A. P. C.), published May 11, 1943.